Jan. 30, 1968

R. G. SARGEANT 3,366,497

METHOD OF PRODUCING A LOW VISCOSITY, HIGH DENSITY
FRUIT JUICE CONCENTRATE

Filed Feb. 9, 1965

INVENTOR
RALPH G. SARGEANT
BY J. Hanson Boyden,
ATTORNEY

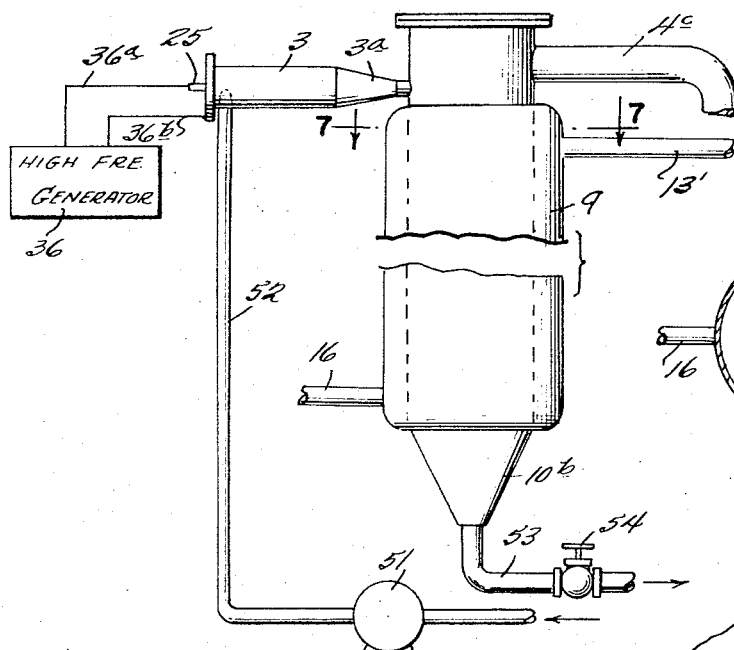

United States Patent Office 3,366,497
Patented Jan. 30, 1968

3,366,497
METHOD OF PRODUCING A LOW VISCOSITY, HIGH DENSITY FRUIT JUICE CONCENTRATE
Ralph G. Sargeant, Lakeland, Fla., assignor to Pet Incorporated, St. Louis, Mo., a corporation of Delaware
Continuation-in-part of application Ser. No. 232,056, Oct. 22, 1962, which is a continuation-in-part of application Ser. No. 841,478, Sept. 22, 1959, which is a continuation-in-part of application Ser. No. 482,056, Jan. 17, 1955. This application Feb. 9, 1965, Ser. No. 435,778
2 Claims. (Cl. 99—205)

This application is a continuation-in-part of my prior co-pending application Ser. No. 232,056, filed Oct. 22, 1962, and now abandoned, which application itself was a continuation-in-part of my prior co-pending application Ser. No. 841,478, filed Sept. 22, 1959, now Patent No. 3,072,490, dated Jan. 8, 1963, which latter application was a continuation-in-part of my prior application Ser. No. 482,056, filed Jan. 17, 1955, and now abandoned.

The invention relates to the preparation of fruit juice concentrates having certain desirable characteristics.

As set forth in said prior applications, the present invention may advantageously use so-called "dielectric heating" for evaporating the fruit juices, that is to say, subjecting the juices being treated to electrical energy in the form of very high frequency oscillations, having a frequency, for example, on the order of 10 to 20 megacycles, more or less.

But the invention, in its broader aspects, is not necessarily limited to the use of high frequency electrical energy, since the liquid may be evaporated by employing other types of heating means, if desired, such, for example, as low temperature steam evaporators.

The standard commercial practice at present is as described in Patent No. 2,453,109, MacDowell et al., namely the packaging of a "four fold" concentrate having a density of about 42° Brix. This is produced by first running the density up to 55° to 65° Brix and then dilute the concentrate with fresh juice to bring the density down to 42° Brix. The addition of fresh juice is necessary to restore the taste and flavor of the product to a degree at which it is acceptable to the public, the original flavor having been damaged by the evaporating process.

Commercially, the juice is evaporated by means of steam evaporators, which are similar in construction to water-tube boilers. The vertical tubes are surrounded by hot steam, and the juice flows by gravity down the tubes, under a partial vacuum. The evaporation of the water depends upon the conduction of heat by the juice itself. No matter how high the vacuum, or how carefully the temperature is regulated, parts of the juice are overheated, caramelized, or given a "cooked" off flavor. This is due to the fact that the walls of the steam heated tubes are too hot, and although the juice may flow along the tubes in the form of a film, the portions of this film in actual contact with the hot walls of the tube become overheated.

As above stated, a density of 42° Brix yields what is called a "four fold" concentrate. A density of 72° Brix would yield an "eight fold" concentrate, which would be highly desirable. Such a high concentrate would have many advantages. It would admit of the addition of a larger amount of fresh juice to bring it down to the standard 42° Brix, if desired, for packing. Or it could be packed in the retail cans at 65° or 72° Brix, thus enabling the purchaser to obtain twice as much reconstituted juice. Or again, it could be packed in bulk, in large cans or drums, and sold to canners, who might reduce it to 42° Brix and pack it for the retail trade.

This would be especially advantageous for export to foreign countries, since it would result in a big saving in freight costs. Moreover, while the 42° Brix concentrate has to be stored at a temperature close to or below zero, the 65° to 72° Brix concentrate will stand storage temperatures as high as 20° to 30° F. without deterioration.

One of the problems encountered in the concentrated fruit juice industry is caused by the well-known fact that, when a pectin containing juice is heated and then cooled, jellification occurs. This is particularly noticeable where the juice is concentrated by conventional steam evaporators, in which the juice is subjected to relatively high temperatures.

In many cases, where an attempt has been made to run the density of orange juice concentrate, for example, up to 65° or 70° Brix with steam evaporators, the concentrate becames very viscous, and tends to gel, and when placed in the cans and cooled, was found to be practically solid jelly.

As a result of such jellification, the product, when reconstituted by the addition of water to produce a juice suitable for drinking, tended to separate, upon standing, into different strata or layers, instead of remaining a uniform mixture, and this separating tendency seriously detracts from the commercial acceptability of the product.

The degree of jellification and resulting tendency to separate varies with the temperature to which the juices are subjected during evaporation, but even with relatively low temperatures these properties occur to a certain extent when using steam evaporators.

For the reasons hereinbefore set forth, it has never been possible, so far as I am aware, to produce by means of steam evaporators of any kind, a 65° to 72° Brix concentrate satisfactory and acceptable as regards taste and flavor, and degree of jellification and separation.

It is believed that high frequency oscillations as above mentioned set up electric currents which traverse the liquid materials being treated, and which, in some cases at least, generate heat within these materials.

The rate at which heat is thus generated depends upon the "loss factor," a factor which is directly proportional to what is known as the "dielectric constant" of the material. Dielectric constants vary from 1 to 8, for most materials ordinarily associated with water, but water has a dielectric constant of about 80. Thus, the dielectric constant of water is from ten to eighty times greater than that of any other material with which water is usually mixed, and therefore water, when subjected to a high frequency field, heats at a much more rapid rate than any other such substance or material.

The action of such high frequency oscillations or field on liquid mixtures is not entirely understood, but it seems probable that in some cases, instead of or in addition to the selective heating effect, the oscillations produce other selective effects on the different components, possibly related to the above mentioned "dielectric constant" of each particular material.

The present invention is directed particularly to the problem of producing acceptable high density concentrates from fruit juices containing substantial amounts of pectin or pectin compounds, such, for example, as apple juice, grape juice, and citrus fruit juices. Some of the citrus fruits, as for example, the popular variety of oranges, known as pineapple oranges, contain particularly large amounts of pectin (as stated in my prior Patent No. 3,072,490).

The above-mentioned characteristics of jellification and separation are closely associated with the question of viscosity, so that the higher the temperature used for evaporation, the higher the viscosity of the product. According to one authority, the viscosity of a 72° Brix orange juice concentrate produced by a steam evaporator at even a relatively low temperature such as 90° to 120° F. will run at least 20,000 centipoises, at 75° F., and even higher. This is due to local overheating and excessive retention time, resulting in an unacceptably high viscosity.

I have discovered that the problem of jellification and high viscosity can be partially solved by the following method. The whole juice, before being introduced into the evaporator, is first run through a suitable centrifuge to separate it into two parts. One of these parts is a heavier portion containing most of the water, acids, sugars, etc., and constituting about 80% of the entire juice. The other part is a lighter portion containing the pectin compounds and complexes, as well as other ingredients such as cellulose fibers, lipids, etc., and constituting about 20% of the entire juice. This pectin containing portion is then stored in a tank or the like, while the watery portion only is evaporated to the desired concentration. By thus first removing the pectin complexes, they are not subjected to the heat of the evaporator.

While I speak of separating the pectin containing portion from the other portion, it will be understood that such separation is not absolutely complete. Thus, the pectin containing portion will contain small amounts of water, sugars, etc., and the watery portion will necessarily contain a certain amount of pectin complexes, cellulose, etc. But the centrifuge effects the separation of the major amounts of the several ingredients.

Because of the fact that the watery portion of the juice necessarily contains a certain amount of pectin, it is highly desirable, when evaporating this watery portion, to maintain the temperature very low, preferably not over 85° F., the same as when evaporating whole juice, in order to hold down the viscosity. Moreover, much of the pectin complexes are contained in the cellulose or fibrous material.

After having substantially separated the juice into the two portions described, and evaporated the watery portion to the desired concentration, several alternate procedures may be followed:

(a) The pectin containing portion, in its natural state, may be at once recombined with the concentrated portion to produce the final product.

(b) The pectin containing portion may be heated or flash-pasteurized to inactivate the pectin complexes and any enzymes present before being recombined with the concentrated portion.

(c) A small amount of water may be added to the fibrous mass containing the pectin complexes to thin it, and then the fibrous material may be strained out and discarded, thus getting rid of the pectin complexes which the fibrous material contained. The liquid passing through the strainer may be added directly back to the concentrated portion, or it may be first heat-treated or flash-pasteurized.

In any event, the separating out of the major part of the pectin complexes, concentrating only the remaining, watery portion of the juice, and thereafter recombining the two portions, results in a product of lower viscosity and less tendency to separate, whatever the method of evaporating employed.

As above mentioned, I have disclosed in my said prior Patent No. 3,072,490 a novel method of evaporating fruit juices by means of high frequency electrical energy, no part of the juice being raised to a temperature of substantially more than 80° F. At a result, I have been able to produce an orange juice concentrate of high density and very low viscosity, possessing a remarkably natural flavor, and having very little tendency to jell or to separate.

By employing the high frequency electrical method of evaporating the juice, disclosed in my said prior patent, and hereinafter described, in connection with the centrifuge separating method above mentioned, I obtain even better results, the final product having an extremely low viscosity, and showing no tendency whatever to jell, or to separate, when reconstituted by the addition of water. In this manner, I have produced concentrated orange juice, for example, having a density of 65° Brix, with a viscosity of only 1200 to 1500 centipoises, and concentrated orange juice having a density of 72° Brix, with a viscosity of not more than 3000 centipoises, at 75° F.

And such high density, low viscosity concentrates, when reconstituted by mixing with water only, without the addition of any fresh juice, provide a drink having essentially the same taste and flavor as the juice from which they are prepared.

In carrying out the centrifuge idea in connection with my improved high frequency electrical evaporator, it will be understood that, instead of employing heat or flash-pasteurizing to treat the pectin containing portion of the juice, or the liquid remaining after the cellulose fiber has been strained out, I subject the material to high frequency electrical energy. Not only does this result in inactivating the pectin complexes but seems to have the effect of vaporizing the water molecule, thus stabilizing or inactivating the pectin enzyme.

In order to illustrate the preferred method of carrying out the invention, independently of the description contained in my said prior applications, reference is had to the accompanying drawings forming part of this specification, and in which:

FIG. 3 is a vertical longitudinal section on an enlarged scale through my improved electrode structure;

FIG. 4 is an end elevation of the apparatus shown in FIG. 3, looking from the left;

FIG. 5 is a transverse section substantially on the line 5—5 of FIG. 3, looking in the direction of the arrows;

FIG. 6 is a side elevation of a modified arrangement of electrode and evaporating chamber, parts being broken away; and FIG. 7 is a horizontal section substantially on the line 7—7 of FIG. 6, looking in the direction of the arrows.

In the commercial preparation of orange juice, the material, after having been crushed or disintegrated, is usually passed through what is known as a "juice finisher," the purpose of which is to separate the juice from the seeds, pulp, etc.

Figure 1:
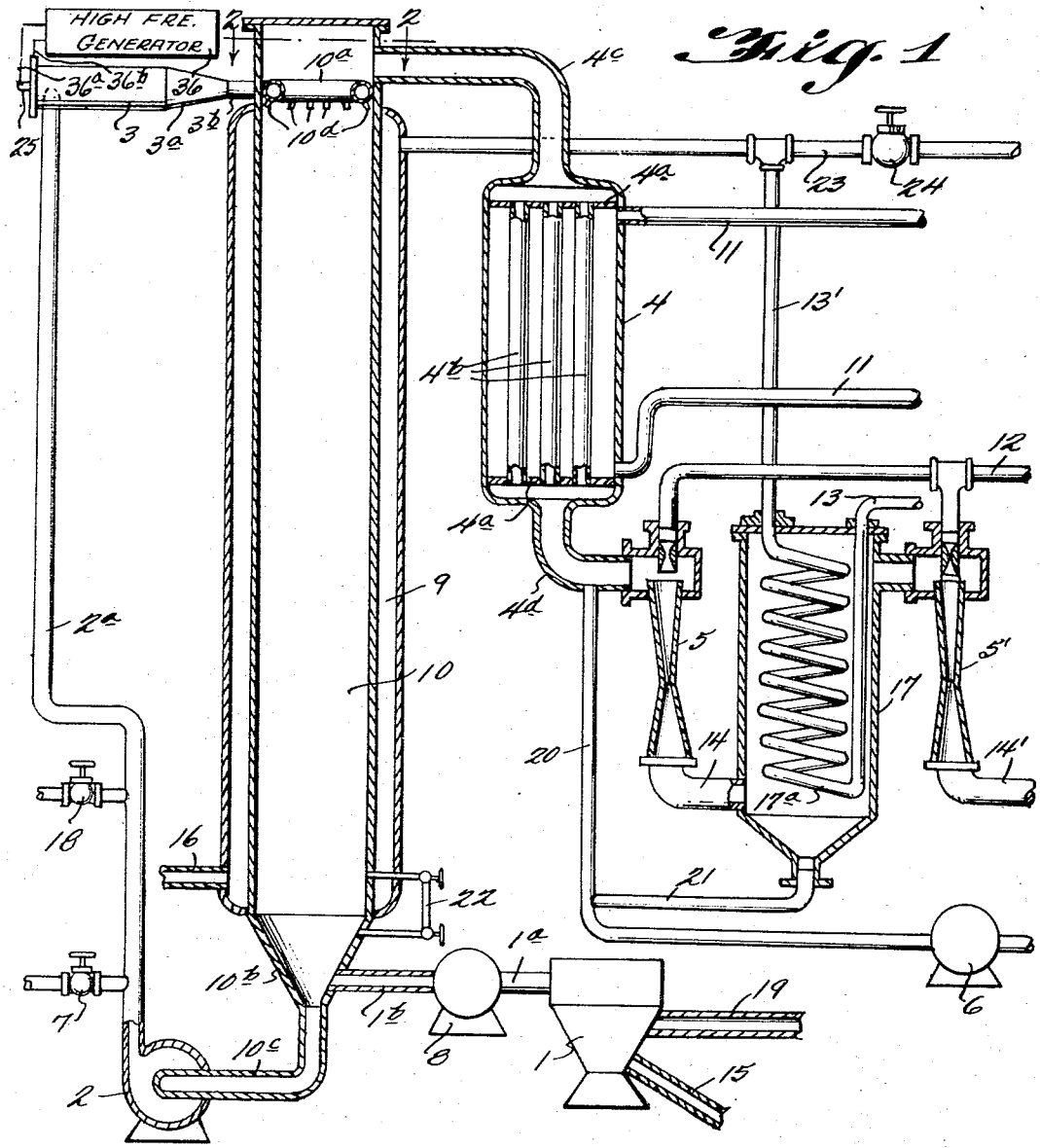
FIG. 1 is a schematic view of the essential equipment used in carrying out one form of the invention.

Referring to the drawings in detail, and more especially first to FIG. 1, the juice from the finisher is fed into the centrifuge 1 through pipe 19. The water-containing portion is delivered from the centrifuge through pipe 1$^a$ to a suitable pump 8, from which it is delivered through a pipe 1$^b$ to the conical bottom 10$^b$ of an evaporating chamber 10.

From the lower end of the conical bottom 10$^b$ extends a pipe 10$^c$ to a centrifugal pump 2 which forces the liquid material up through a vertical pipe 2$^a$ to the top of the evaporating chamber 10 where it is delivered to a spray head 10$^a$ which directs the material into contact with the vertical walls of the evaporating chamber. The material then flows down these walls to the conical bottom 10$^b$ where it is again recirculated or recycled by the pump 2.

Figure 2:
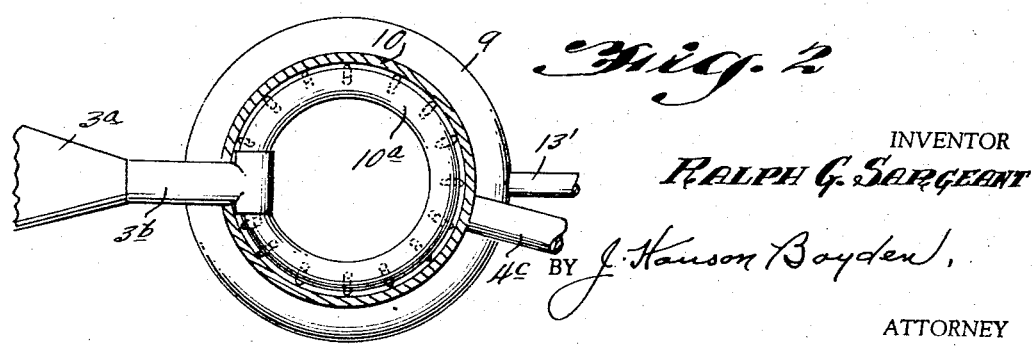
FIG. 2 is a sectional plan view on an enlarged scale substantially on the line 2—2 of FIG. 1.

The preferred construction of the spray head is best shown in FIG. 2. It consists of an annular or ring-shaped pipe having a series of nozzles 10$^d$ projecting outwardly and downwardly from its lower side, so as to spray the liquid against the walls of the chamber.

Interposed in the pipe 2$^a$ is a dielectric heating device or electrode structure 3 through which the liquids circulate. The details of the preferred form of this device are shown in FIGS. 3 to 5. It consists of a horizontally disposed cylindrical casing or shell having a restricted or tapering end 3$^a$, discharging axially of the casing into a pipe 3$^b$ connected with the spray head 10$^a$. Mounted at the other end of the cylindrical structure and extending axially thereof is a central electrode in the form of a rod 25, so that an annular space is provided between this rod and the cylindrical shell. This central electrode, which is shorter than the cylindrical shell, is supported wholly at one end, the other end, adjacent the discharge opening of the shell, being free. The pipe 2$^a$, which feeds the liquid into the electrode structure, is arranged to deliver the same tangentially into the cylindrical shell adjacent the end at which the electrode rod is mounted, so that the liquid tends to whirl around the annular space as it travels toward the discharge end of the shell. This whirling or spiral movement of the liquid tends to prevent deposits on the inner surface of the cylindrical shell and keep such surface clean. Furthermore, it may be desirable in some cases to apply to the surface a protective coating of some suitable material such as a silicone, to prevent adhesion.

The inner electrode or rod is supported by a disc 26 of insulating material, to which it is clamped by means of nuts 31, and the disc itself may conveniently be supported on the wall 27 of a suitable housing having an opening 28. The end of the cylindrical shell or outer electrode is shown as flanged at 3$^d$, and this flange is secured to the wall 27 by means of bolts 29 passing through the flange, the wall 27, and a clamping ring 30. The central electrode is connected with one terminal of a suitable high-frequency generator by means of a conductor 32, secured to the threaded end of the rod 25 by means of a nut 34. Preferably, and as shown, this conductor is in the form of a copper tube, having its end flattened and perforated as at 33, for attachment to the electrode rod, and cooled by water circulating therethrough by means of hose connections 35. Owing to the "skin effect" of high frequency currents, the electrical energy is carried mostly on the surface of the electrode rod 25, and it is advantageous to have this rod, which may be of stainless steel, plated with a good conducting non-corrosive metal such as silver.

In use, the electrode structure is connected with the two sides of a high-frequency generator 36, one side being connected through a well insulated lead 36$^a$ with the central rod 25, and the other side connected by lead 36$^b$ with the electrode shell or casing, which is grounded. Preferably, and as usual in the art, such connection is made by means of a coaxial cable.

The pectin-carrying components of the juice are discharged from the centrifuge 1 through the pipe 15 to a suitably refrigerated storage tank, where they are held in storage until the water-carrying component which is being recirculated through the evaporating chamber as above described has reached the desired concentration. Samples of the product can be withdrawn from time to time through spigot 18 for testing, to determine when the desired concentration has been reached. This concentrated component is then withdrawn through valve 7 and thereafter recombined with the stored pectin-carrying component to produce the desired final product. As above explained, this pectin-carrying component may be recombined with the concentrated component either in its natural state, or after having been treated in any one of several ways to reduce the pectin content or inactivate the pectin-enzymes, so as to reduce the tendency of the product to jellify.

By thus separating the juice into two components and evaporating only one of these components, a very substantial saving in power results, and the time cycle is also greatly reduced. Furthermore, the pectin-carrying components of the juice are not exposed to the heat of evaporation and consequently the final product does not tend to jell when cooled.

From the top of the evaporating chamber 10 extends a pipe 4$^c$ to a condenser 4 of any suitable type shown as a shell and tube condenser having tube sheets or bulk heads 4$^a$ adjacent each end, between which extend tubes 4$^b$.

A pipe 4$^d$ extends from the bottom of the condenser 4 to a steam-operated air ejector 5, supplied with steam through a pipe 12. This ejector draws the vapors from the evaporating chamber down through the tubes of the condenser 4, and the steam and vapors are delivered from the ejector 5 through a pipe 14 into an intercondenser 17. A second air ejector 5' draws the uncondensed steam and vapors from the condenser 17 and discharges through pipe 14' to atmosphere.

To eliminate the costly construction required with a barometric condenser such as is commonly used for this purpose, I employ a surface-type condenser, containing a coil 17$^a$. Water is fed to one end of this coil by a pipe 13, and from the other end extends a pipe 13' to a jacket 9 which surrounds the evaporating chamber 10. Thus, the water which is heated in the coil 17$^a$ by the steam and vapors from the air ejector 5 is utilized to transfer this heat to the walls of the evaporating chamber 10. As the liquid material flows down inside of these walls, it is maintained at a relatively warm temperature by the water jacket 9 and prevented from cooling off substantially as it otherwise would do. A pipe 23, controlled by a valve 24, is connected with pipe 13', and through this pipe 23 cold water may be admitted to regulate the temperature of the jacket 9 as desired.

By way of example, it may be stated that by means of the air ejector above described, a vacuum is maintained on the evaporating chamber to an extent of at least 29½ inches, so that the water contained in the liquid mixture being treated evaporates at about 70° F., and the temperature of the water jacket 9 is such that the temperature of the liquid being evaporated as it flows down the walls of the chamber 10 does not fall substantially below 75° F. By virtue of utilizing the heat from the condenser 17 by means of this water jacket 9, the amount of power required to be delivered to the electrode structure 3 is greatly reduced, thus effecting a substantial economy. In practice, the level of the liquid being treated in the evaporating chamber is maintained approximately at the upper end of the conical bottom 10$^b$, thus permitting the liquid to flow down the entire length of the water-jacketed walls. In order to observe the level of the liquid in the evaporating chamber, a sight glass 22 is preferably provided adjacent the bottom thereof.

A suitable refrigeration medium such as "Freon" gas is supplied to the condenser 4 by pipes 11, from a suitable compressor, in a well-known manner, this apparatus being so designed as to maintain the condenser 4 at a temperature of approximately 50° F. Thus the vapors coming off through pipe 4$^c$ are mostly condensed, and the condensate flows out from the bottom of the condenser through pipe 20 to a pump 6. A pipe 21 from the bottom of condenser 17 delivers additional condensate into the pipe 20.

Water fed into the condenser coil 17$^a$ may be derived from any suitable source, but a further economy may be achieved by utilizing water from the condenser of the compressor supplying the refrigerating medium to condenser 4 as above described. Thus, water may be caused to flow continuously first through the compressor condenser and then through the coil 17$^a$ to the jacket 9, from which it escapes through pipe 16. This water absorbs heat from the compressor condenser and is somewhat warm when it enters the coil 17$^a$. It is then further heated by the steam from ejector 5 before passing on to the water jacket.

While I have shown and described a centrifuge for separating the fresh juice into two components, only one of which is subjected to evaporation, it will of course be understood that the separating step may be omitted if desired and the whole juice concentrated by means of my improved evaporator system. This has been done successfully, with the results described in detail hereinafter.

Where the whole juice is evaporated, my improved method has a special advantage in connection with the pectin present in the juice. By employing high frequency electrical energy, and operating at a very low temperature and under a high vacuum, no portion of the juice is heated to a point high enough to cause the pectin, when the juice is cooled, to tend to jell. This avoidance of jellification may be due, as above stated, to the fact that the temperature of all portions of the juice is maintained below the critical temperature at which the pectin is caused to jell, or it may be that the high frequency electrical energy to which the juice is subjected has an effect on the pectin, or may break down or change the character of the enzymes present. In any event, the fact is that juice evaporated and concentrated in accordance with my improved method shows no tendency to jellify when cooled, and, when reconstituted by mixing with water, shows no tendency to separate. This in itself is a novel and important achievement.

Referring again to FIG. 1, the pipe $2^a$ is slightly larger than the restricted outlet $3^b$ discharging the juice from the electrode structure, so that the pump 2 tends to generate a substantial pressure within the electrode structure. Thus, the high frequency electrical energy is applied to the juice while it is under pressure.

Furthermore, the sum total of the areas of the spray nozzles $10^b$ is preferably somewhat greater than the cross-sectional area of the restricted discharge $3^b$, with the result that the pressure in the spray head $10^a$ is somewhat less than in the electrode structure.

The high frequency generator 36 which I employ is of the well known type embodying one or more oscillating thermionic tubes. The exact frequency is not critical, but should be what is known as radio frequency. For example, a frequency of 60 cycles per second, such as ordinary house current, would not be high enough to produce the desired results. Furthermore, with such a low frequency current electrolysis is likely to occur at the inner electrode. It is thought that a frequency of anywhere within the range of 1 to 25 or more megacycles will operate satisfactorily. In practice, I have usually employed a frequency on the order of 15 to 20 megacycles. In any event, the important thing is that the electrode structure be so proportioned as to be electrically resonant to the frequency employed.

The juice passing through the electrode structure 3 is usually heated. The difference in temperature of the juice entering and leaving the electrode structure is referred to as the temperature differential. The apparatus has been operated with a temperature differential as high as 40° F., and again it has been operated with a very small temperature differential of not more than one or two degrees F. A temperature differential of 5° to 10° F. gives satisfactory results.

The temperature differential depends, of course, on the rate of flow of the juice through the electrode structure and on the amount of electrical energy supplied by the generator. Apparently the lower the temperature differential, the better the product obtained.

If, as has been done successfully, the temperature differential is held at near zero, such, for example, as 1° or 2°, then there is practically no sensible heating of the juice as it passes through the electrode structure. The high frequency energy may have some effect other than heating. For example, the high frequency electrical energy may operate to produce a separation of the water particles or molecules from the other components. It is not known with certainty just what effect the high frequency energy has on the liquid mixture, but the fact is that the application of such high frequency energy to the liquid mixture produces the results described herein.

A vacuum of at least 29" to 29½" of mercury is maintained in the evaporating chamber 10 and the water in the jacket 9 is regulated so as to keep the temperature of this chamber at around 75° F. When the liquid mixture is sprayed into this chamber through the spray nozzles $10^d$ the water present immediately flashes into steam or vapor which is drawn off through the conduit $4^c$. As the water vaporizes, it absorbs a large amount of heat, namely, the so-called latent heat of vaporization.

It will be understood that the electrode structure, when operating, is not hot to the touch, and that, when the rate of flow is such as to maintain only a small temperature differential between the inlet and discharge ends, it is difficult to detect any sensible heating. In hot weather, the juice is preferably first refrigerater or cooled, so that it comes into the electrode structure at a temperature no higher than 60° to 65° F. If then it is heated 5° to 10° F. by the electrical energy, it is discharged into the vacuum chamber at 65° to 75° F., at which temperature, under the high vacuum employed, the water flashes into vapor, as above mentioned. This temperature of not over 85° F. is, of course, not high enough to sterilize the product. Thus, the concentrate, as already mentioned, has to be stored under refrigeration.

It will be particularly noted that at no point in the cycle does the liquid come in contact with any surface hotter than 75° to 85° F. This is in sharp contrast to the temperature of 130° to 140° F. encountered in the conventional steam evaporators.

By way of example, but in no sense as a limitation, the following figures may be given. With an electrode structure having an outside diameter of 3" to 4" and a length of 18" to 20", an inner electrode about ¾" in diameter and 12" or 14" long is employed. The pump 2 generates a hydraulic pressure of as high as 60 lbs. per square inch in the electrode structure and, as above described, this is reduced to about 25 lbs. per square inch at the spray head. The rate of flow through the electrode structure may be on the order of 30 gallons per minute, but of course this may be varied by controlling the speed of the pump. The amount of electrical energy supplied to the electrode structure is on the order of 9 kilowatts.

With equipment such as described in the foregoing example, it is possible to produce an orange juice concentrate having a density of as high as 80° Brix, without any caramelization or off flavor. At the same time, owing to the fact that the temperature of the juice at all points is maintained very low, the viscosity is exceptionally low.

Tests have been run, among others, with the whole juice of the pineapple variety of orange, which variety, as already stated, is known to contain a large amount of pectin. At a density of 65° Brix, for example, the viscosity of this concentrate at 75° F. was on the order of 1200 to 1500 centipoises, and at a density of 72° Brix did not exceed about 3000 centipoises. This compares with a viscosity of around 15,000 to 20,000 centipoises for the same concentrate brought to the same density by the thermal conduction method in the conventional steam evaporator. Thus, the viscosity of the high density concentrate prepared by my improved method is only a fraction of that of concentrates of the same density prepared by conventional methods. More specifically, it is less than half. So far as I am aware, I am the first to produce an orange juice concentrate having so high a density combined with such a low viscosity.

This low viscosity is due in part at least to the fact that the liquid is heated with absolute uniformity as it passes through the electrode structure when employing a temperature differential high enough to substantially heat the liquid.

When thus regarding my improved electrode structure as a heating device, it is apparent that the electrical energy is applied across or transversely of the mass of liquid. If the high frequency electrical energy may be regarded as a "current", this current flows radially through the annular mass of liquid, thus uniformly heating all portions thereof. In other words, the same heating effect is applied at all points throughout the mass.

It seems to be a fact that, as set forth herein, the water present in the liquid mixture heats first, and faster than the other components. This, as above explained, is due to the very high "dielectric constant" of water. So, when I say that all portions of the liquid mixture are "uniformly heated," I mean that there is no zone, point, stratum or layer of the mass that is subjected to any greater heating effect than any other zone, point, stratum or layer, and use of the expression "uniformly heated" is not intended to exclude the possibility that, because of their character, some components distributed through the mass may be heated faster or more strongly than others.

This idea of "uniformly heating" all portions of the liquid is in sharp contrast to the conventional commercial systems in which steam evaporators are employed. As above mentioned, in these commercial plants, in which the liquid being treated flows through steam heated tubes and is heated by conduction, the portions or layers of the liquid in direct contact with the hot walls of the tubes are heated to a much higher temperature than the other portions. And this is true, even though the liquid flows along the tubes in the form of a relatively thin film. It is for this reason that, in the case of citrus juice, it is impossible to avoid a certain amount of caramelization, and relatively high viscosity, as the density increases.

Under some circumstances, I have found it desirable to concentrate the citrus juice first by means of a conventional evaporator using the thermal conduction method until a density of 50° to 55° Brix is reached, and then introduce this partially concentrated product into my improved high frequency electrical apparatus herein described, where the density is carried up to 72° to 80° Brix, without producing any caramelization or "off" flavor.

By employing the centrifuge step and carrying out the entire operation from start to finish by means of my improved high frequency electrical apparatus as herein described, I am able to reduce the viscosity of the final product still further. For example, I can produce a concentrate of a density of 72° Brix having an unprecedentedly low viscosity of only 2500 to 2700 centipoises, at 75° F.

What I claim is:

1. The method of producing a low viscosity concentrate from citrus juice containing a substantial amount of pectin; said concentrate having a density of at least 72° Brix, and capable of being reconstituted by mixing with water alone, without the addition of fresh juice, to provide a drink having a flavor essentially the same as that of the juice from which the product is prepared, comprising first centrifuging the whole juice to substantially separate the pectin-containing portion from the water-containing portion, storing the pectin-containing portion in a suitable receptacle, causing the water-containing portion only to flow in the form of a solid, confined stream under substantial hydraulic pressure through a high frequency dielectric heating device directly into a partial vacuum, regulating the amount of electrical power and the rate of flow of the juice portion in such manner that the temperature differential between the liquid entering and leaving said heating device is maintained within a range of 2° to 40° F., controlling the temperature and pressure of said partial vacuum so that the water present in the juice portion entering the same flashes into vapor, continuing such evaporation until the juice portion reaches a concentration having a density greater than that of the final product, and thereafter recombining said concentrated juice portion with said pectin-containing portion to produce the desired low viscosity product.

2. In the preparation of high density, low viscosity concentrates from fruit juices containing substantial amounts of pectin, the method of eliminating any tendency of the concentrated product to jell when cooled, and to separate when reconstituted by mixing with water, which comprises first centrifuging the whole juice to substantially divide it into two portions, namely a portion containing most of the water, sugars and acids, and a portion containing the major part of the pectin, cellulose and lipids, storing the pectin-containing portion in a suitable receptacle, causing the water-containing portion alone to flow in a confined stream along a closed path under substantial hydraulic pressure, applying to such portion of the juice while so flowing high frequency electrical energy, discharging the stream at the end of such closed path into a partial vacuum, controlling the temperature and pressure of said partial vacuum so that the water present flashes into vapor, leaving a concentrated residue having a density greater than that of the final product, and finally recombining this concentrated residue with said pectin-containing portion to produce the desired product.

References Cited
UNITED STATES PATENTS

| | | | |
|---|---|---|---|
| 2,602,134 | 7/1952 | Nelson | 99—208 X |
| 2,724,652 | 11/1955 | Brent et al. | 22—205 |
| 3,072,490 | 1/1963 | Sargeant | 99—205 |

HYMAN LORD, *Primary Examiner.*

A. LOUIS MONACELL, *Examiner.*

R. S. AULL, *Assistant Examiner.*